United States Patent [19]

Gassler

[11] Patent Number: 5,074,094
[45] Date of Patent: Dec. 24, 1991

[54] NODAL POINT CONNECTION

[76] Inventor: Kurt Gassler, Erpfmühler, 7419 Sonnenbühl-Erpfingen, Fed. Rep. of Germany

[21] Appl. No.: 566,981

[22] Filed: Aug. 13, 1990

[30] Foreign Application Priority Data

Aug. 16, 1989 [DE] Fed. Rep. of Germany ....... 3926979

[51] Int. Cl.$^5$ ............................................. E04H 12/18
[52] U.S. Cl. ........................................ 52/648; 52/171; 52/176
[58] Field of Search ................... 52/36, 648; 403/171, 403/176, 172

[56] References Cited

U.S. PATENT DOCUMENTS

| 4,021,973 | 5/1977 | Hegg et al. | 52/36 |
| 4,480,418 | 11/1984 | Ventrella | 403/176 |
| 4,763,459 | 8/1988 | Wesselski | 52/648 |

*Primary Examiner*—Richard E. Chilcot, Jr.
*Assistant Examiner*—Wynn Wood
*Attorney, Agent, or Firm*—Michael J. Striker

[57] ABSTRACT

The nodal point connection has a nodal body (10) having bearing grooves (11-13) and coupling parts (18) which are insertable into the bearing grooves in a positive-locking manner, and spreading springs (17.1-17.4) which are arranged between the nodal body disks (10.1-10.4) defining the individual bearing grooves (11-13). The spreading springs (17.1-17.4) press the nodal body disks (10.1-10.4) apart when the screw connection (15/16) holding together the nodal body disks is loosened. The bearing grooves (11-13) provided with narrowed openings (11.1, 12.1, 13.1) are accordingly widened so that the coupling heads (18) of the coupling parts can be inserted into the bearing grooves. The coupling heads advisably have a length which is greater than the greatest cross-sectional diameter of the coupling head (18) whose cross section is adapted to the cross section of the bearing grooves (11-13).

10 Claims, 11 Drawing Sheets

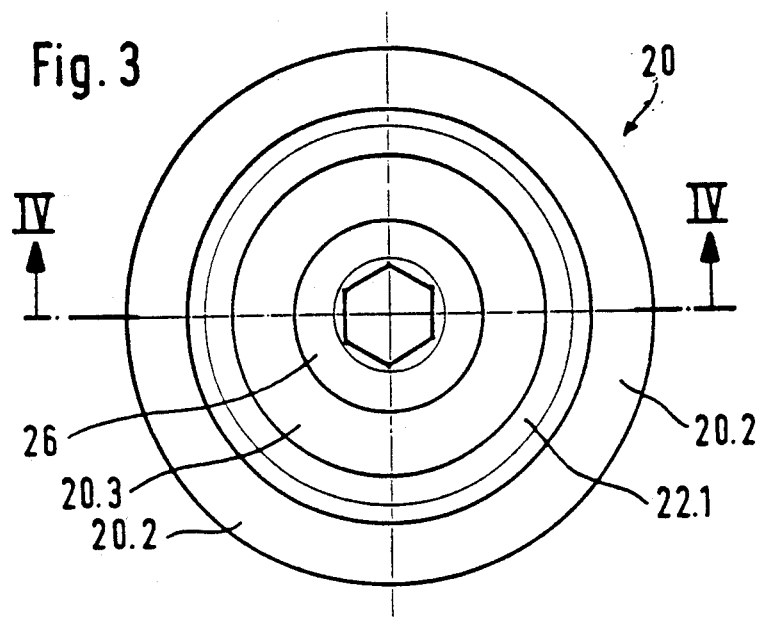
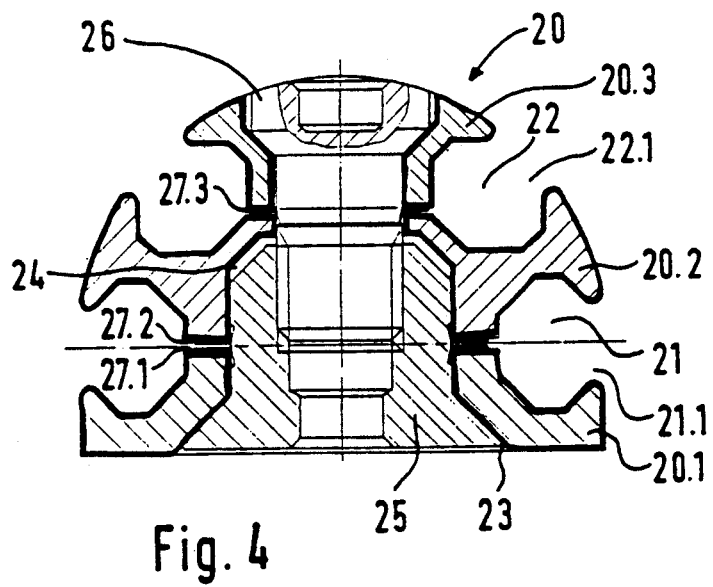

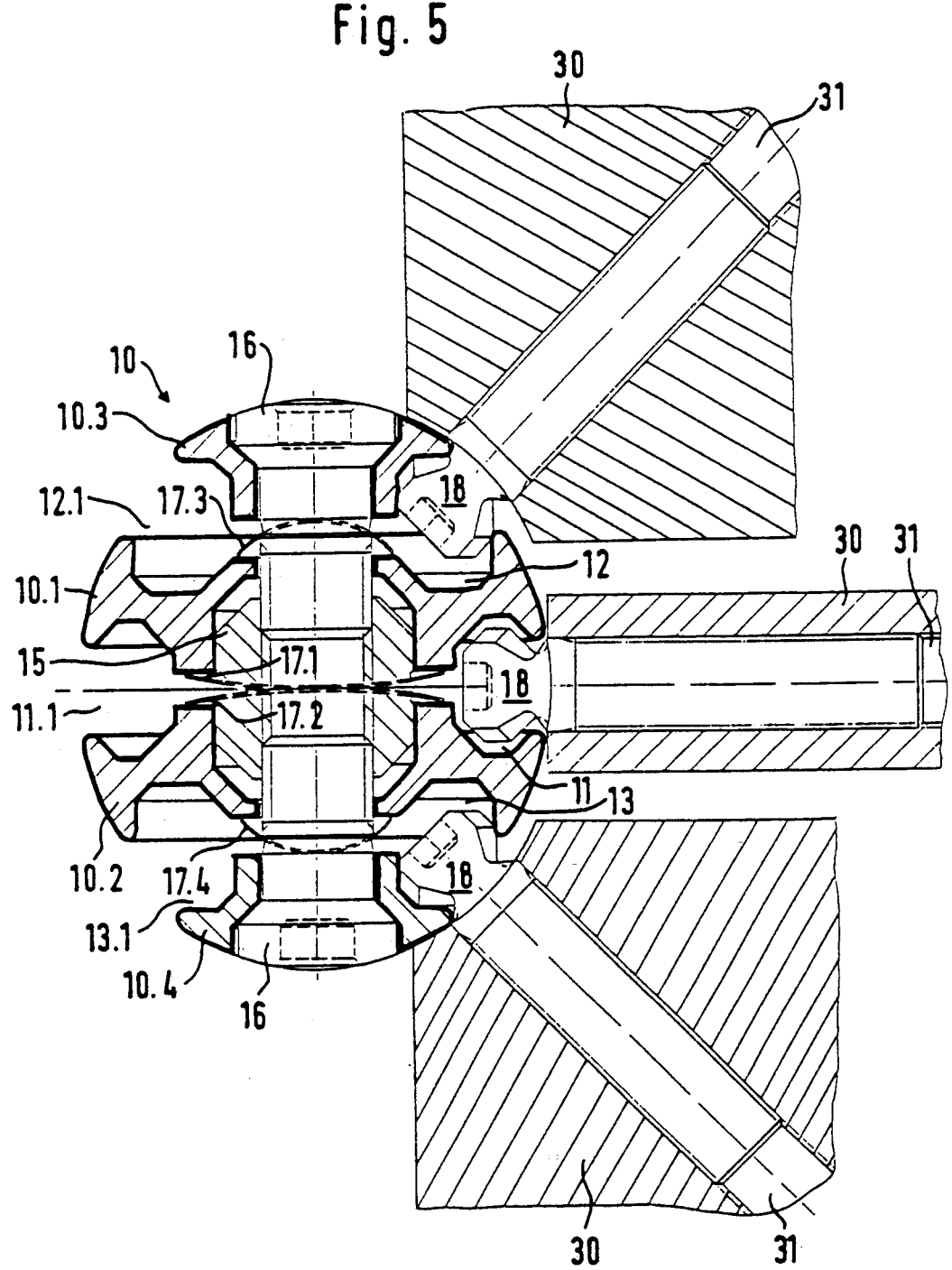

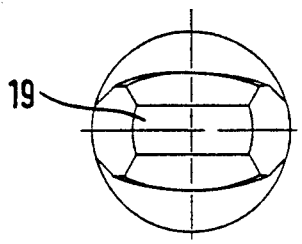
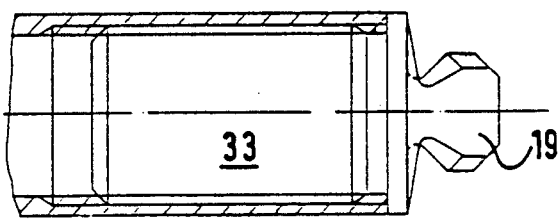
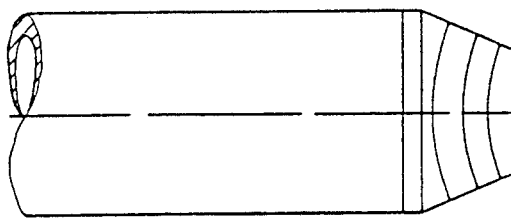
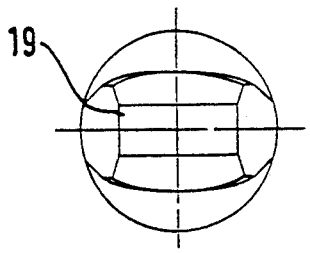
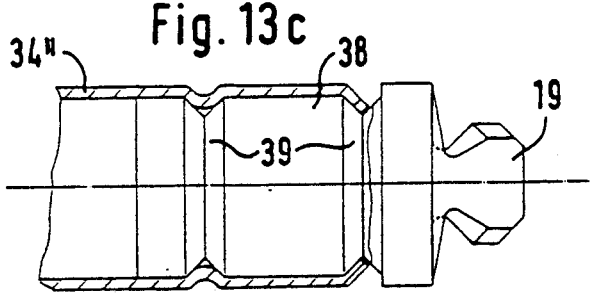
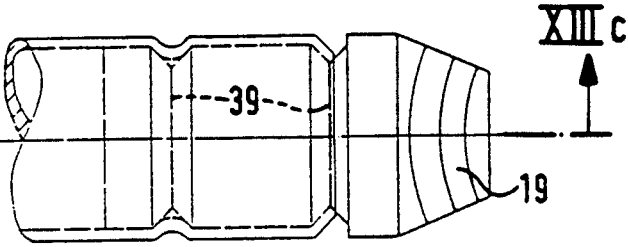

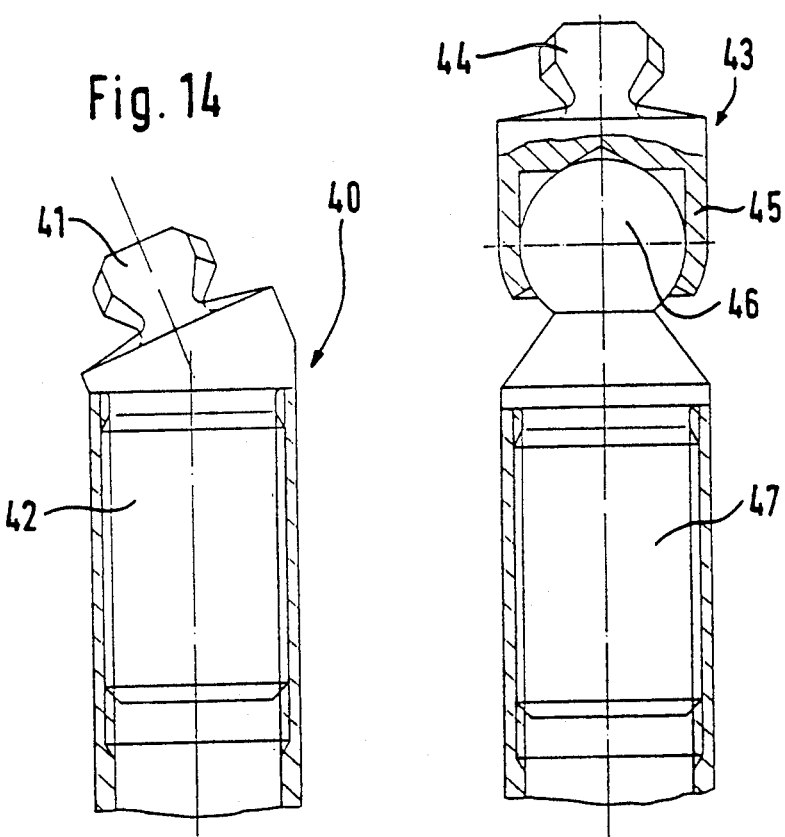

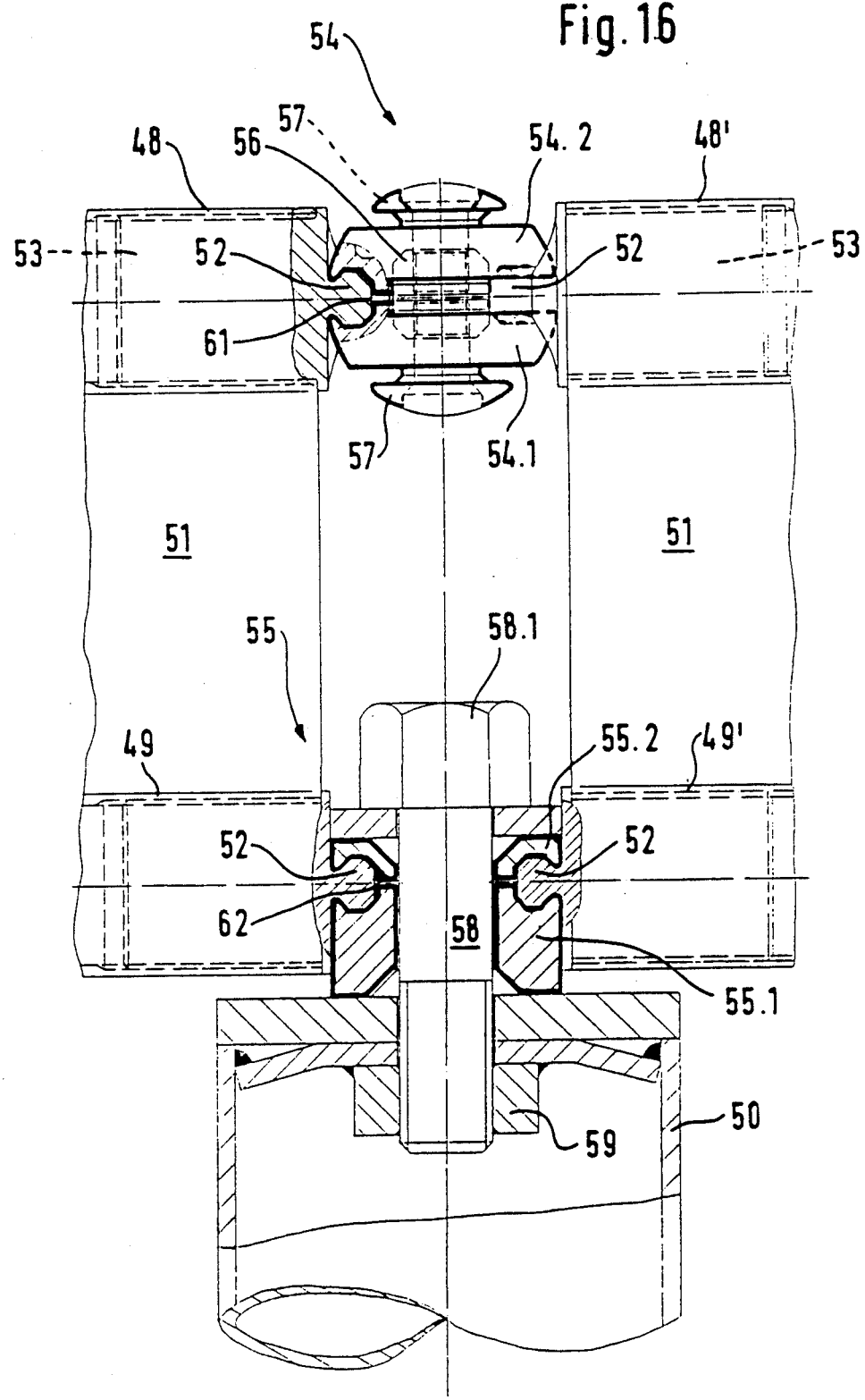

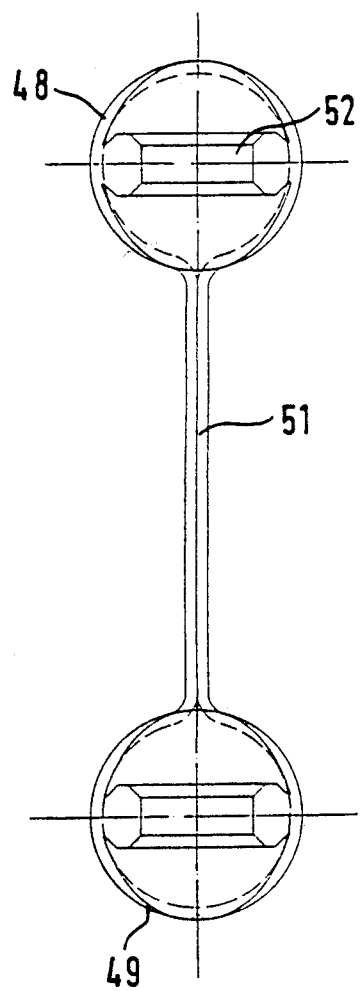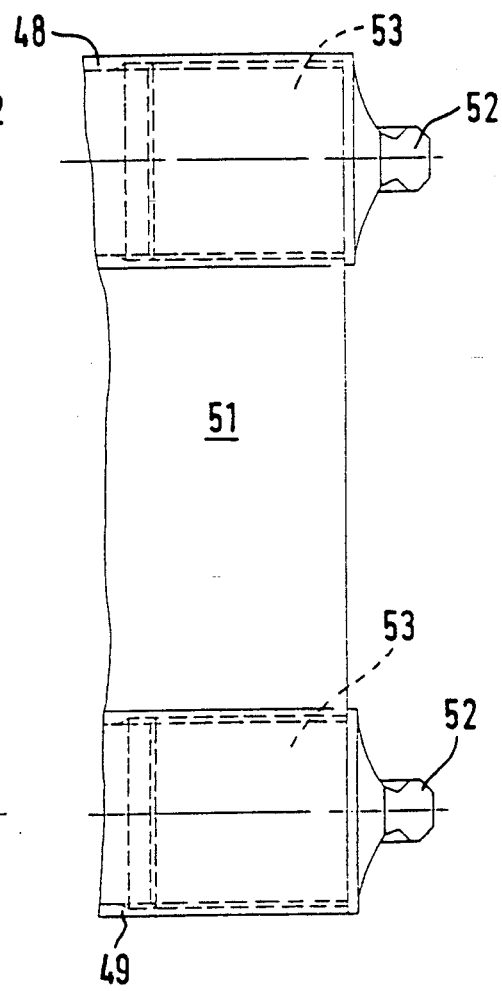

NODAL POINT CONNECTION

BACKGROUND OF THE INVENTION

The invention is directed to a nodal point connection for building parts, e.g. of exposition buildings, which are easy to assemble and disassemble, comprising a nodal body which has at least one bearing groove with a narrowed opening which is constructed partly in one and partly in the other of two nodal body disks which can be screwed together, and comprising coupling parts which can be inserted into the bearing groove and held therein in a positive-locking manner and has a cross section which is adapted to the cross section of the bearing groove.

Nodal point connections with the aforementioned features are known from DE-OS 30 19 787 and DE-OS 30 35 698. In these nodal point connections, the coupling parts are constructed as rotating/plug-in connection parts. These are spherical coupling parts with lateral flattened portions which allow the coupling parts to be introduced in a determined position through the narrowed opening into the bearing groove, where they are then brought into a positive-locking locking position by rotation. The known nodal point connections thus have the disadvantage that the nodal bodies, during assembly or disassembly, comprise the narrowed opening cross section of their bearing groove and nodal body disks which are screwed together in the finished state, so that the coupling parts must necessarily have a shape which allows their rotation within the bearing groove, which in turn requires a tapering of the coupling parts in the area of the narrowed opening of the bearing groove. However, these tapered places are the weak points of the entire connection construction. These weak points must be dimensioned in such a way that they can withstand the loads occurring at the building parts. The rotating/plug-in connection parts must have a correspondingly thicker diameter, which in turn determines the dimensioning of the nodal body and leads as a whole to nodal point connections resulting in a relatively large space requirement with oversized nodal bodies.

SUMMARY OF THE INVENTION

The invention has the object of constructing a nodal point connection of the type named in the beginning in such a way that oversized nodal bodies can be dispensed with and weak points at the coupling parts can be prevented.

The proposed object is met, according to the invention, with a nodal point connection of the type named in the beginning, in which spreading springs are arranged between the individual nodal body disks, which spreading springs press apart when the screw connection of adjacent nodal body disks is loosened accompanied by widening of the bearing groove, or grooves, adjoining them and allow the introduction of the coupling heads of the coupling parts effecting the positive-locking connection.

Thus, in a nodal point connection constructed according to the invention, nodal bodies are at hand during assembly whose bearing groove or bearing grooves are widened, so that coupling parts having a greater thickness than the normal width of the opening cross section of the bearing groove can be inserted before the nodal body disks of the nodal body are screwed together accompanied by narrowing of the bearing groove on their end cross section. The coupling parts must accordingly no longer be rotating/plug-in connection parts. They can preferably have a length in the circumferential direction of the bearing groove which is greater than the greatest diameter of the cross section of the bearing groove, so that there is a connection cross section of the coupling parts in the area of the narrowed bearing groove opening which is substantially larger than would be possible in the known rotating/plug-in connection parts. Accordingly, the nodal body must also not be made oversized.

The screw connection of the nodal body disks can preferably comprise a nut body which is arranged in a central recess of at least two adjacent nodal body disks and in which at least one connection screw can be anchored for holding together at least two nodal body disks. It is evident that the screw length of the connection screws in the nut body is kept sufficiently large in this construction, so that the nodal body disks can move apart sufficiently far under the influence of the spreading springs when the connection screw(s) is (are) loosened, without the screw connection being completely detached and the nodal body falling apart into its individual pieces.

In order to increase the stability of the nodal point connection, the bearing groove cross section and the coupling part cross section can advisably have a plurality of corners. All multiple-edged bearing grooves can be advantageously produced with a milling tool of identical dimensions regardless of their length. The milled grooves are produced in the individual nodal body disks by the position and movement of the milling tool in such a way that they all result in bearing grooves with a uniform cross section which is adapted to the coupling heads. The coupling parts which are adapted to the cross section of the bearing groove can have different widths and are advantageously constructed as multiple-edged ring sectors which adapt to a curved configuration of a bearing groove. In order to connect them with a desired building part, a frame web or a frame pipe, the coupling parts can be coupled in a manner known per se with a threaded socket or an anchoring part which is provided with at least one circumferentially extending retaining groove for flanging walls. This coupling can also be effected in an articulated manner, so that the coupling part can occupy a different angular position relative to its anchoring part.

BRIEF DESCRIPTION OF THE DRAWING

Embodiment examples of nodal point connections constructed according to the invention are explained in more detail in the following with the aid of the appended drawings.

FIG. 3 shows a top view of a second embodiment form of a nodal body of the nodal point connection;

FIG. 4 shows a central longitudinal section through the nodal body along line IV—IV in FIG. 3;

FIG. 5 shows a central longitudinal section through a nodal body according to FIGS. 1 and 2 with loosened screw connection and with inserted coupling parts;

FIGS. 12a, b, c show a coupling part with a threaded socket, screwed into a frame pipe in a front view, side view and in longitudinal section;

FIGS. 13a, b, c show views, corresponding to FIG. 12, of a coupling part flanged in a frame pipe;

FIG. 14 shows a longitudinal section through a coupling part which is angled relative to its threaded socket;

FIG. 15 shows a longitudinal section through a coupling part which is connected with its anchoring part in an articulated manner;

FIG. 16 shows a side view of a double nodal point connection, partly in section;

FIG. 17 shows the front view of a coupling part used in the double nodal point connection according to FIG. 16;

FIG. 18 shows the coupling part shown in FIG. 17 in a side view.

DETAILED DESCRIPTION OF THE INVENTION

Figure 1:
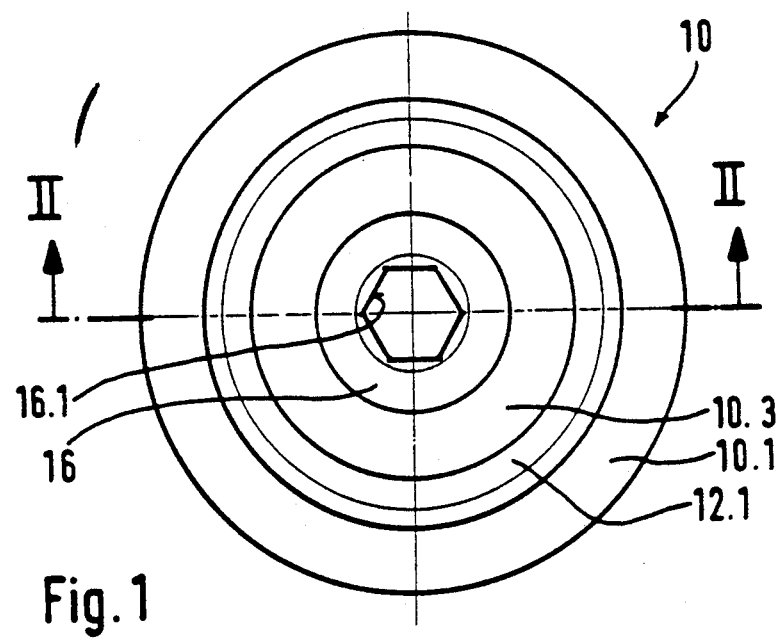
FIG. 1 shows a top view of a first embodiment form of a nodal body of the nodal point connection.

FIGS. 1, 2 and 5-18 show a spherical nodal body 10 of a nodal point connection which is composed of four nodal body disks, specifically two identical inner nodal body disks 10.1 and 10.2 and two identical outer nodal body disks 10.3 and 10.4. The four nodal body disks 10.1-10.4 define, in pairs in each instance, three continuous bearing grooves 11, 12 and 13 which extend parallel to one another and all have the same multiple-cornered, cross section and a narrowed groove opening 11.1, 12.1 and 13.1.

The two inner nodal body disks 10.1 and 10.2 have a central recess 14 serving jointly to receive a nut body 15 which has a continuous threaded bore hole. The two outer nodal body disks 10.3 and 10.4 have, in each instance, a central through-opening which is coaxial to the central recesses 14 of the two other nodal body disks 10.1 and 10.2; a connection screw 16, which is provided in each instance with a hexagon socket 16.1 and can be screwed into the central nut body 15, can be inserted into the central through-opening. The two connection screws 16 can be inserted from opposite sides into the threaded through-hole of the nut body 15 along a large screw thread length.

Figure 2:
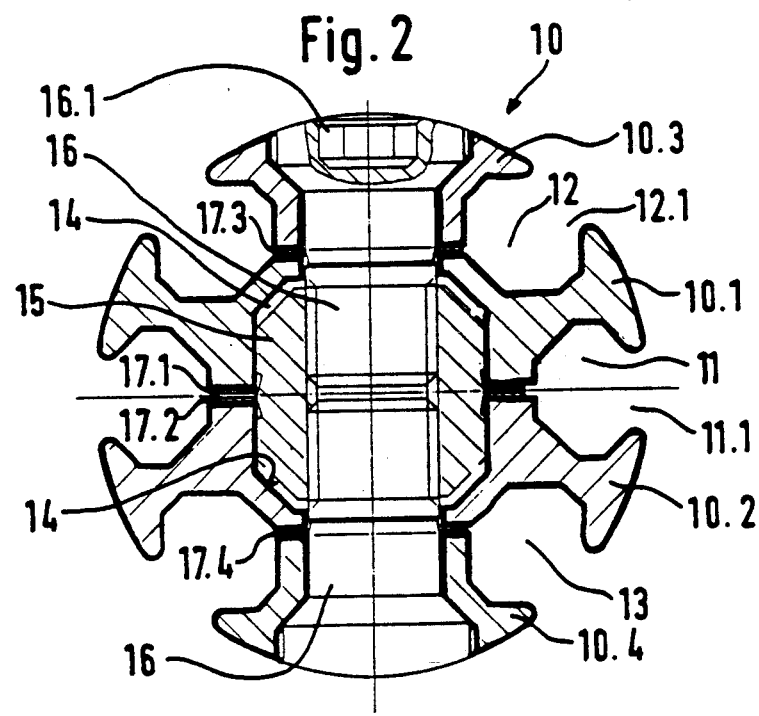
FIG. 2 shows a central longitudinal section through the nodal body along line II—II in FIG. 1.

At least one annular plate spring 17.1, 17.2, 17.3 or 17.4 which tends to press apart the two adjacent nodal body disks 10.1-10.4 is inserted between adjacent nodal body disks. The sectional diagram of FIG. 2 shows the nodal body 10 in the fixed connection state in which all nodal body disks 10.1-10.4 are drawn toward one another by securely screwing the connection screws 16 into the nut body 15, and the annular plate springs 17.1-17.4 located between the individual nodal body disks lay flat.

Figure 6:
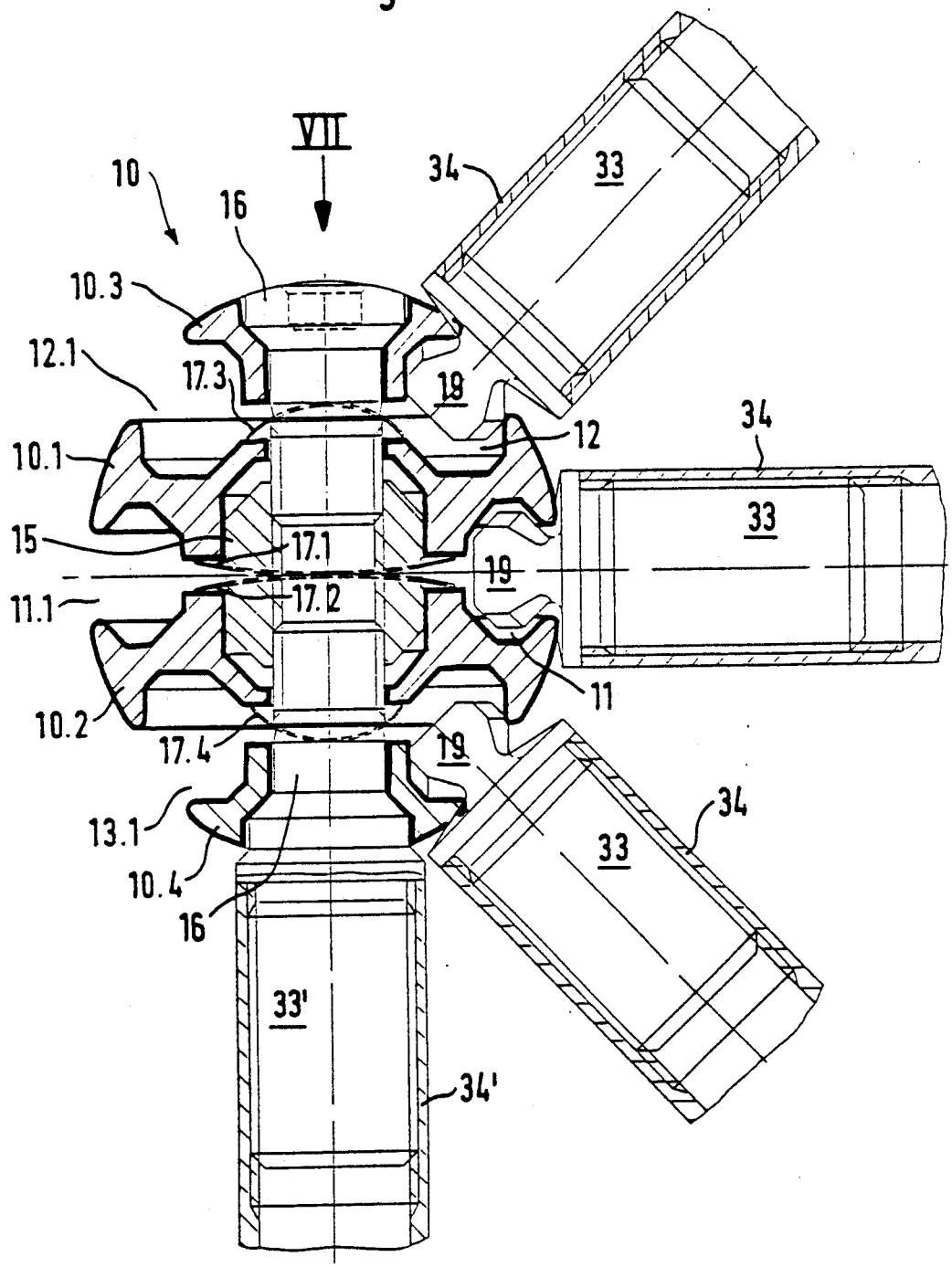
FIG. 6 shows a view corresponding to FIG. 5 with inserted coupling parts whose anchoring parts differ from those of the coupling parts according to FIG. 5.

On the other hand, the sectional diagrams of FIGS. 5 and 6 show the nodal body in an initial state of assembly in which the two connection screws 16, 16' are screwed into the nut body 15 along only a few turns. In this state, adjacent nodal body disks 10.1-10.4 are pressed apart by the annular plate springs 17.1-17.4, so that the bearing groove openings 11.1-13.1 are widened enough so that the widened coupling heads of coupling parts 18 or 19 can be inserted into the widened bearing grooves 11, 12 and 13.

FIGS. 3 and 4 show a nodal body 20 which is only partly spherical and comprises three different partial body disks 20.1, 20.2 and 20.3 which define, in pairs in each instance, two parallel continuous bearing grooves 21 and 22 with narrowed groove openings 21.1, 22.1. A central nut body 25 is again inserted into central recesses 23 and 24 of the two nodal body disks 20.1, 20.2; a connection screw 26, which is guided through a central through-opening of the nodal body disk 20.3, can be screwed into the threaded bore hole of the central nut body 25. Annular plate springs 27.1, 27.2 and 27.3 are again arranged between the individual nodal body disks 20.1-20.3. In this case, also, by loosening the connection screw 26, the nodal body 20 can be brought into an initial state of assembly in which the nodal body disks 20.1-20.3 can be pressed apart by means of plate springs 27.1-27.3 accompanied by expansion of the bearing groove openings 21.1 and 22.1. Two identical nodal bodies 20 can be combined in an arrangement which is symmetrical in the manner of an inverted mirror by means of a reciprocal nut part 25 and can form a nodal body with four continuous bearing grooves.

Figure 7:
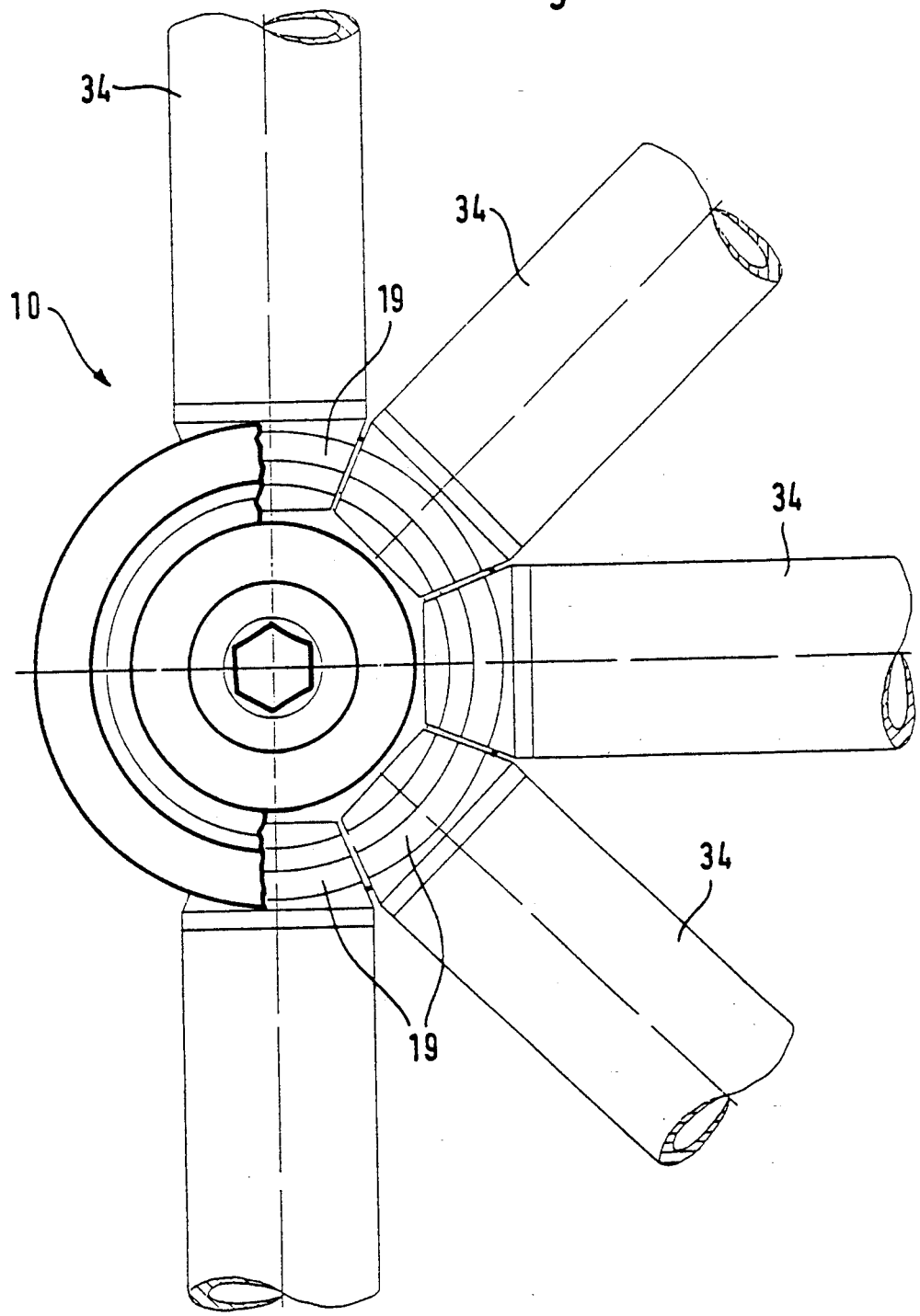
FIG. 7 shows a top view of the nodal point connection shown in FIG. 6 in the direction of arrow VII in FIG. 6.
Figure 11A:
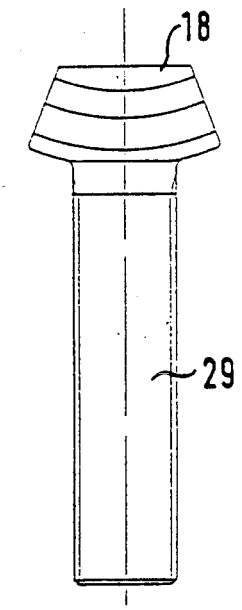
Figure 11B:
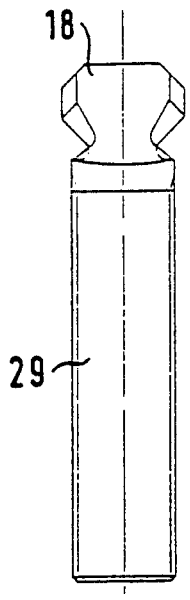

All of the coupling parts cooperating with the nodal bodies 10, 20 have a coupling head whose cross section is adapted to the multiple-cornered cross section of the bearing grooves 11-13 or 21, 22 of the nodal bodies 10 or 20. But the coupling parts can differ from one another with respect to the length of their coupling heads and the construction of anchoring parts by which they are connected with building parts or frame parts. Coupling parts 18, which can be seen particularly from FIGS. 11a and 11b, are shown in FIG. 5. The coupling heads 18 have the shape of multiple-edged ring sectors and have a length which is greater than the greatest diameter of their cross section or of the cross section of the bearing groove in which they are anchored. The length of the coupling heads 18 extends along an angular area of the bearing groove of 40°. The coupling heads 18 are securely connected with an anchoring part in the shape of a long threaded pin 29 by which the coupling parts formed by the coupling heads 18 can be screwed, according to FIG. 5, e.g. into bore holes 31 of optionally constructed wall parts 30 which are to be connected with one another by means of nodal bodies. The coupling heads 19 of the coupling parts shown in FIG. 6 have the shape seen in FIGS. 9a, 9b. The coupling heads end in a plate 32 by which they can be securely connected, according to FIG. 6, with anchoring parts in the form of a threaded socket 33, e.g. by welding. The threaded socket 33 of the coupling parts and coupling heads 19 seen in FIGS. 6 and 7 are screwed into the ends of frame pipes 34 which are provided with an internal thread for this purpose. According to FIG. 6, one of the connection screws 16' of the nodal body 10 is connected, via a threaded socket 33', directly with a frame pipe 34' which must be rotated during the final assembly of the nodal body for turning in the connection screw 16'. The coupling parts shown in FIGS. 5 and 6 can naturally also be inserted together at the nodal body.

Figure 8:
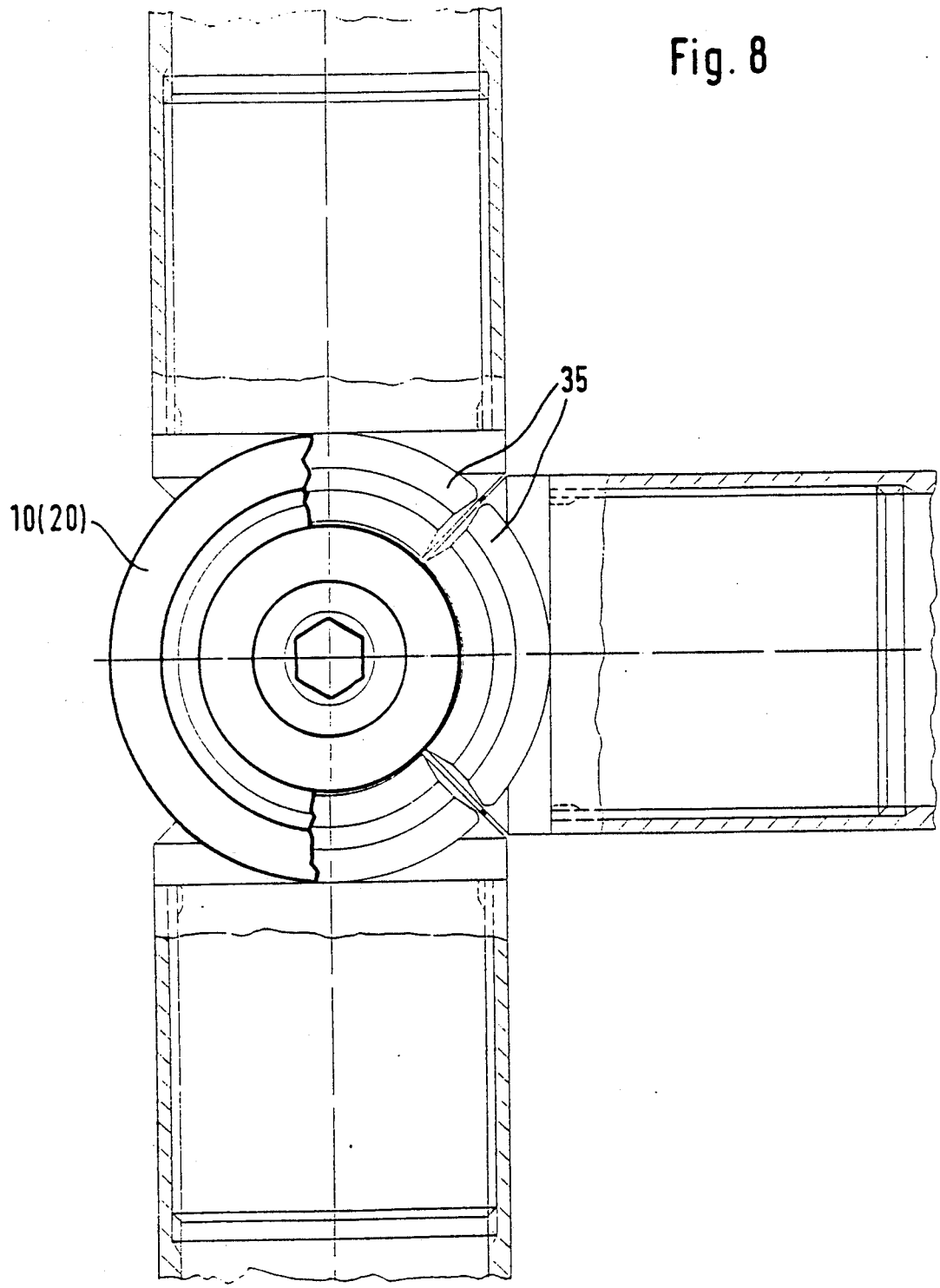
FIG. 8 shows a top view corresponding to FIG. 7 of a nodal point connection with coupling parts which are dimensioned differently.
Figure 9A:
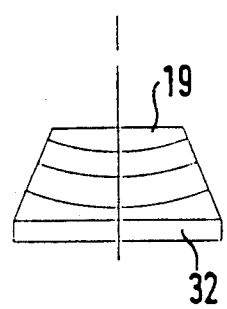
FIGS. 9a, 9b, 10a, 10b, 11a, 11b show three coupling parts in a view from the top and side whose anchoring parts differ from one another.
Figure 9B:
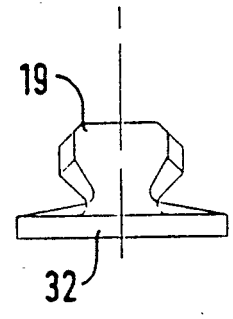

As can be seen from FIG. 8, the coupling parts can be provided with coupling heads 35 of greater length which allow a particularly great transmission of force.

In this instance, the coupling heads 35 extend along an angular area of 90°. However, smaller coupling head lengths are preferred because they can then be inserted without difficulty into any of the bearing grooves of a nodal body 10 or 20 which have different lengths.

Figure 10A:
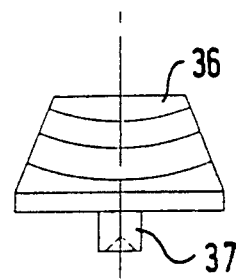
Figure 10B:
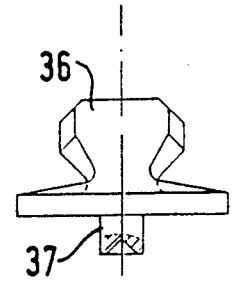

FIGS. 10a and 10b show a coupling head 36, which corresponds in length to the coupling heads 18 and 19 and which ends in a small mounting pin 37 at which it can be soldered or clamped into a building part or frame part in a manner which is not shown.

FIGS. 12a–12c show a detailed view of a coupling part which can already be seen in FIG. 6 and which has a coupling head 19 which is anchored in a frame pipe 34 via a threaded socket 33. FIGS. 13a–13c show a coupling part with a coupling head 19 which, in place of a threaded socket 33, comprises a threadless anchoring pin 38 which is provided with two annular grooves 39 for flanging the wall of a frame pipe 34".

FIG. 14 shows a coupling part 40 in which the coupling head 41 is connected in diagonal position with a threaded socket 42. FIG. 15 shows a coupling part 43 whose coupling head 44 is provided with a step bearing 45 which, together with a ball head 46 connected with a threaded socket 47 as anchoring element, forms a ball-and-socket joint.

The nodal body and coupling parts can be modified in different ways and adapted to particular application requirements while retaining the features substantial to the invention. FIGS. 16 to 18 show such a special example. In this case, e.g. horizontal supporting pipes 48, 49; 48', 49' extending at a distance parallel to one another are to be detachably connected with a e.g. vertical supporting column 50 The two horizontal supporting pipes 48, 49 and 48', 49' are held at a mutual distance from one another by means of spacing webs 51, 51' or also by means of continuous spacing walls. Coupling heads 52 are again anchored into the ends of the supporting pipes 48, 49, 48', 49' by means of threaded sockets 53. Two nodal bodies 54 and 55 are provided, the upper nodal body 54, with reference to FIG. 16, comprising only two nodal body disks 54.1 and 54.2 which can correspond to the nodal body disks 10.1 and 10.2. As in the nodal bodies 10, 20 which have already been described, a central nut body 56 is arranged in the nodal body disks 10.1 and 10.2, two connection screws 57 being anchored in the central nut body 56 for holding together the two nodal body disks. The connection screws 57 can correspond to the connection screws 16. The coupling heads 52 are anchored in the bearing groove defined by the two nodal body disks 54.1 and 54.2.

The nodal body 55 likewise has only a single bearing groove which is defined by two nodal body disks 55.1 and 55.2, which are different in this case, and receives the coupling heads 52. The two nodal body disks 55.1 and 55.2 are fastened on the supporting column 50 and, in so doing, are simultaneously securely connected with one another by means of a single fastening screw 58 which is guided through central through-holes of the two nodal body disks 55.1, 55.2 and can be screwed into a nut 59 which is anchored in the supporting column 50. A washer 60 is arranged between the head 58.1 of the connection screw 58 and the upper nodal body disk 55.2. It is evident in the case of the two nodal bodies 54 and 55 that annular plate springs 61 and 62, which spread apart the bearing grooves of the nodal bodies when the connection screws 57 or 58 are loosened, are again arranged between the two nodal body disks.

It will be understood that each of the elements described above, or two or more together, may also find a useful application in other types of structures differing from the types described above.

While the invention has been illustrated and described as embodied in a nodal point connection or connector, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. In a nodal point connection for building parts, which is easy to assemble and disassemble, said nodal point connection comprising a nodal body having at least one screw member and a plurality of nodal body disks which define a plurality of annular bearing grooves each with a narrowed opening, and said nodal point connection further comprising a plurality of coupling parts each having a coupling head for connecting with said nodal body, wherein said bearing grooves are defined partly by one and partly by an adjacent one of said plurality of said nodal body disks, which disks can be connected with one another by the screw member and wherein each coupling head, which can be inserted into one of said bearing grooves and held therein in a positive-locking manner, has a cross section which is adapted to a cross section of the bearing groove, the improvement further comprising at least one spreading spring (17.1–17.4; 27.1–27.3; 61; 62) arranged between adjacent individual nodal body disks (10.1–10.4; 20.1, 20.2; 54.1, 54.2; 55.1, 55.2), which spreading springs (17.1–17.4; 27.1–27.3; 61; 62) press apart, when the screw member securing adjacent ones of said nodal body disks is loosened accompanied by widening of the bearing groove or grooves defined by the nodal body disks, and allow insertion of the coupling heads (18, 19, 36, 41, 44, 52) of the coupling parts effecting the positive-locking connection.

2. The improvement as defined in claim 1, wherein said nodal body contains a nut body (15; 25; 56) which is arranged in a central recess (14, 24) of at least two adjacent nodal body disks (10.1, 10.2; 20.1, 20.2) and in which at least one connection screw (16; 26; 57) can be anchored as said screw member for holding together said adjacent nodal body disks.

3. The improvement as defined in claim 1, wherein each of the coupling heads in the circumferential direction of the bearing groove have a length which is greater than the greatest diameter of the bearing groove cross section.

4. The improvement as defined in claim 1, wherein the bearing groove cross section and the coupling head cross section have a plurality of corners.

5. The improvement as defined in claim 1, wherein said bearing grooves extend in parallel planes through the nodal body, all of said bearing grooves (11, 12, 13; 21, 22) are multi-edged and of identical dimensions produced with a milling tool except for a length of the bearing grooves (11, 12, 13; 21, 22).

6. The improvement as defined in claim 1, wherein the coupling heads (18, 19, 35, 36, 52) have the form of multiple-edged ring sectors.

7. The improvement as defined in claim 1, wherein the coupling parts are provided with a threaded socket (29, 33, 53) for anchoring in an opening of a pipe (34, 48, 49).

8. The improvement as defined in claim 1, wherein each of the coupling parts have an anchoring part (38) which is provided with at least one circumferentially extending groove (39) for flanging walls.

9. The improvement as defined in claim 8, wherein the coupling head (44) of the coupling part (43) is connected in an articulated manner with said anchoring part (47).

10. The improvement as defined in claim 1, wherein the coupling parts are provided with a threaded socket (29, 33, 53) for anchoring in a threaded bore hole (31) of a building part (30).

* * * * *